United States Patent [19]

Dykstra et al.

[11] Patent Number: 4,858,982
[45] Date of Patent: Aug. 22, 1989

[54] VISOR

[75] Inventors: Ronald A. Dykstra; William J. Fluharty, both of Holland, Mich.

[73] Assignee: Prince Corporation, Hollland, Mich.

[21] Appl. No.: 160,133

[22] Filed: Feb. 25, 1988

[51] Int. Cl.$^4$ .............................................. B60J 3/02
[52] U.S. Cl. ................................... 296/97.5; 296/97.8
[58] Field of Search ................. 296/97 R, 97 B, 97 C, 296/97 H, 97 G, 97 K, 97 J

[56] References Cited

U.S. PATENT DOCUMENTS

| | | | |
|---|---|---|---|
| 1,898,276 | 2/1933 | Van Dresser | 296/97 G |
| 1,941,032 | 12/1933 | Knowles | 296/97 G |
| 2,107,247 | 2/1938 | Johnson | 296/97 G |
| 2,120,892 | 6/1938 | Francis | 296/97 G |
| 2,201,197 | 5/1940 | Minor, Jr. | 296/97 G |
| 2,261,881 | 11/1941 | Horstmann | 296/97 G |
| 2,276,585 | 3/1942 | Mandel | 296/97 G |
| 2,492,074 | 12/1949 | Thompson | 296/97 K |
| 2,517,872 | 8/1950 | Hamel | 296/97 G |
| 2,596,873 | 5/1952 | Solmes | 296/97 G |
| 2,634,161 | 4/1953 | Beets | 296/97 K |
| 2,667,222 | 1/1954 | McCarthy et al. | 296/97 R |
| 2,695,193 | 11/1954 | Hamel | 296/97 K |
| 2,823,950 | 2/1958 | Harris | 296/97 R |
| 2,912,275 | 11/1959 | O'Neal | 296/97 K |
| 2,921,813 | 1/1960 | Lowry | 296/97 C |
| 2,948,566 | 8/1960 | Massey | 296/97 G |
| 2,965,415 | 12/1960 | Dryden | 296/97 K |
| 3,016,262 | 1/1962 | Hunt | 296/97 G |
| 3,191,986 | 6/1965 | Simon | 296/97 K |
| 3,480,322 | 11/1969 | Pollak | 296/97 G |
| 3,499,679 | 3/1970 | Olander | 296/97 G |
| 3,556,585 | 1/1971 | Binder | 296/97 K |
| 3,617,088 | 11/1971 | Graham | 296/97 G |
| 3,649,068 | 3/1972 | Moynihan | 296/97 G |
| 4,169,552 | 10/1979 | Lichtenstein et al. | 296/97 G |
| 4,227,241 | 10/1980 | Marcus | 362/61 |
| 4,248,473 | 2/1981 | Hildebrand | 296/97 G |
| 4,323,275 | 4/1982 | Lutz | 296/97 G |
| 4,352,518 | 10/1982 | Prince et al. | 296/97 G |
| 4,362,330 | 12/1982 | Cramer | 296/97 G |
| 4,369,966 | 1/1983 | Fluck | 296/97 K |
| 4,500,131 | 2/1985 | Fleming | 296/97 G |
| 4,570,990 | 2/1986 | Flowerday | 296/97 G |
| 4,681,363 | 7/1987 | Hemmeke et al. | 296/97 J |
| 4,690,450 | 9/1987 | Boerema et al. | 296/97 K |

FOREIGN PATENT DOCUMENTS

| | | | |
|---|---|---|---|
| 1396360 | 3/1965 | France. | |
| 2497157 | 7/1982 | France | 296/97 R |

Primary Examiner—Joseph F. Peters, Jr.
Assistant Examiner—Jesùs D. Sotelo
Attorney, Agent, or Firm—Price, Heneveld, Cooper, DeWitt & Litton

[57] ABSTRACT

A multiplex visor includes a plurality of nested panels which can be moved with respect to one another to provide sun blocking and other functions of a multiple visor installation using a single visor. In one embodiment, a duplex visor is longitudinally split on a center curvilinear plane extending between the front and rear of the visor to provide a single visor having independently movable halves or panels for providing front and side window sun blocking protection. In another embodiment of the invention, a triplex visor includes three separately movable nested panels with a first panel being pivoted from a nested position within a second panel and including a vanity mirror.

28 Claims, 6 Drawing Sheets

VISOR

BACKGROUND OF THE INVENTION

The present invention relates to a vehicle visor.

Recently, automotive visor installations using multiple visors have become increasingly popular. U.S. Pat. Nos. 4,681,363 and 4,690,450 disclose two such multiple visor installations in which two separate visor panels are employed. Typically, one visor is a primary visor panel which may include an illuminated vanity mirror package; and the other visor a secondary visor which may be in the form of a generally flat molded blade which includes an extension slide. These visors are mounted between a pair of mounting brackets specifically designed to receive multiple visors such that the two separate visors can be moved to provide simultaneous front and side window protection against sun glare. U.S. Pat. application Ser. No. 866,272, filed May 23, 1986, entitled VISOR, also discloses a multiple visor installation providing simultaneous front and side window protection.

Although these multiple visor installations provide the desired sun blocking protection, they are somewhat bulky. In as much as two separate visors are employed, with the decreasing available space particularly in the forward windshield and headliner area of modern vehicles, such two visor installations are more difficult to accommodate. Further, with modern vehicle designs, the utilization of some multiple visor installations is somewhat less attractive than a single visor installation.

SUMMARY OF THE PRESENT INVENTION

The system of the present invention overcomes the difficulties incurred by the somewhat bulky and complex installations of some of the prior art multiple visor installations by providing a single multiplex visor with a plurality of nested panels which can be divided to provide the sun blocking and other functions of a multiple visor panel installation using a single visor. In one preferred embodiment of the invention, a duplex visor is longitudinally split on a center curvilinear plane extending between the front and rear of the visor to provide a single visor having independently movable halves or panels for providing front and side window sun blocking protection. One of the panels may include an illuminated vanity mirror and can remain at the forward portion of the windshield. Means are provided for mounting the visor panel halves to a single pivot bracket having multiple offset arms to allow the desired motion of the panels making up the visor. In another preferred embodiment of the invention, a triplex visor includes three separately movable nested panels with a first panel being pivoted from a nested position within a second panel and including a vanity mirror. Thus, a vanity mirror can be incorporated in the visor and used without the need for moving the entire visor. The second visor panel is used as a windshield visor while a third nested panel can be pivoted to the side window position for use in blocking light from the side window.

When the two panels of the duplex visor or three panels of the triplex visor are nested, the overall size and appearance of the visor is that of a single conventional visor. In either of the preferred embodiments, the visor panels are configured to nest within one another in closely adjacent relationship, and in the preferred embodiments, one panel will include a concave portion which receives a convex portion of at least a second panel of the visor.

These and other features, objects, and advantages of the present invention will become apparent upon reading the following description thereof together with reference to the accompanying drawings in which:

DETAILED DESCRIPTION OF THE PREFERRED EMBODIMENT

Figure 1:
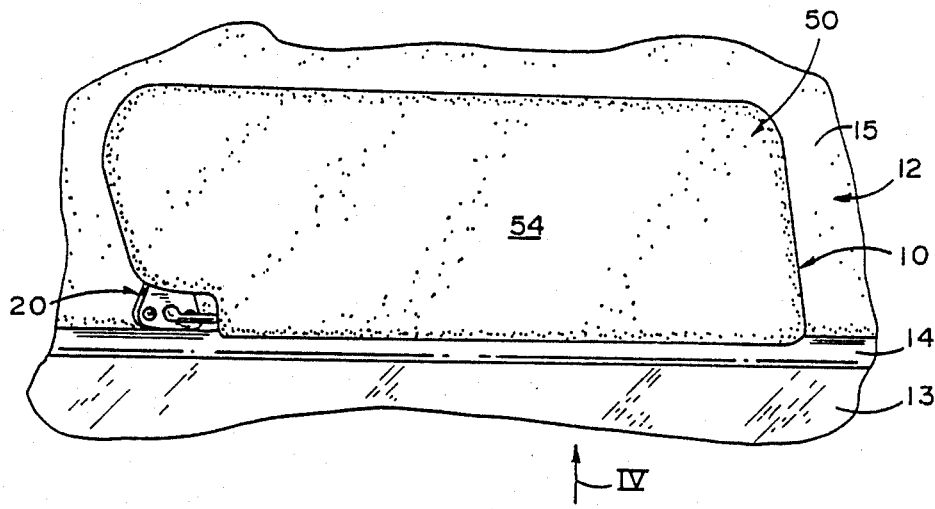
FIG. 1 is a perspective view of one embodiment of a visor of the present invention shown in a raised stored position.
Figure 2:
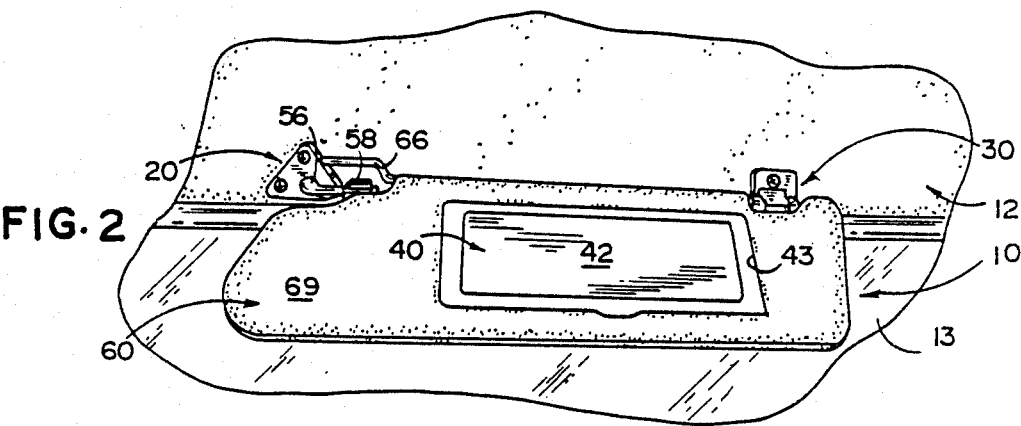
FIG. 2 is a perspective view of the visor shown in FIG. 1 shown in a lowered first use position.
Figure 3:
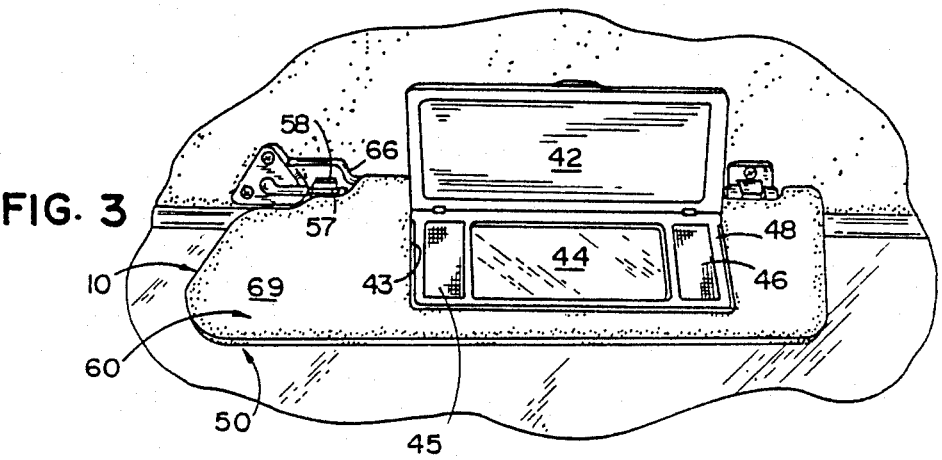
FIG. 3 is a perspective view of the visor shown in FIG. 2 with the cover open, disclosing an illuminated vanity mirror contained therein.
Figure 4:
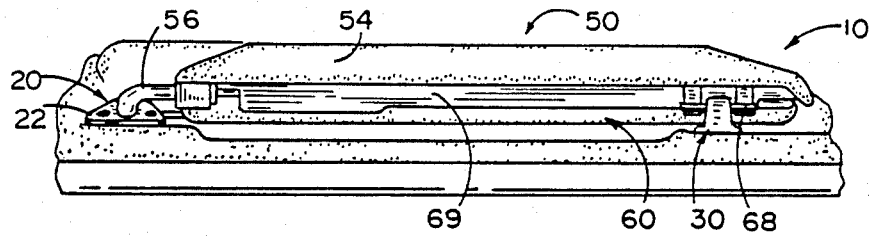
FIG. 4 is a bottom plan view of the visor shown in FIG. 1 taken along in the direction of arrows IV—IV in FIG. 1.

Referring initially to FIG. 1, there is shown a visor 10 embodying the present invention and mounted to the roof 12 of a vehicle such as an automobile above the windshield 13 and the trim molding 14 by means of a first pivot mounting bracket 20, and as seen in FIG. 2, a secondary mounting bracket 30. The visor 10 is shown in FIG. 1 in a raised stored position adjacent the vehicle headliner 15 and in FIG. 2 in a lowered use position which is employed for blocking sunlight from entering the upper windshield area. Visor 10 includes a covered, illuminated vanity mirror package 40 including a cover 42 which can be snap-opened and closed as illustrated in FIGS. 2 and 3 to expose a vanity mirror 44 which may be illuminated by illumination means 45 and 46 mounted within the mirror frame 48 and inserted into the body of visor 10. The illuminated vanity mirror package 40 can be of the type described in U.S. Pat. application Ser. No. 912,798, filed Sept. 26, 1986, entitled VISOR, the disclosure of which is incorporated herein by reference.

The visor shown in FIGS. 1-3 has an appearance substantially the same as that of visors shown, for example, in U.S. Pat. No. 4,227,241 with the improved upholstery covering technique disclosed in U.S. Pat. No. 4,570,990. Such earlier visors have met with tremendous popularity and are in common use in vehicles. Visor 10, however, is a duplex visor which as seen in FIGS. 4-7 includes an outer visor panel 50 which is pivotally mounted to and separable from a second visor panel 60.

Figure 5:
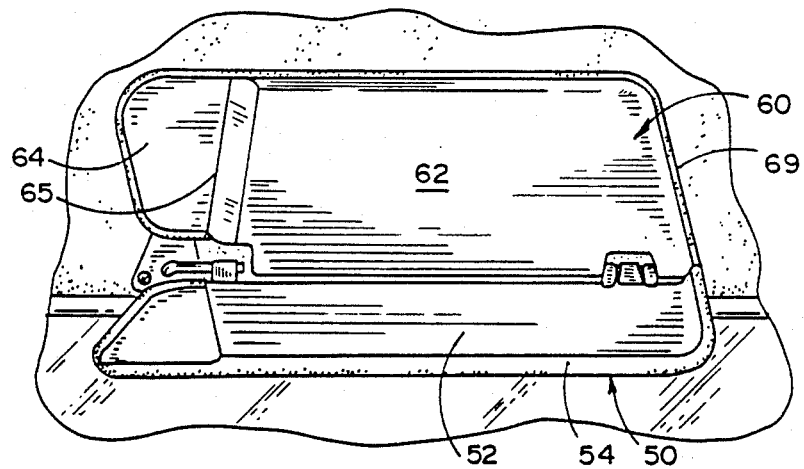
FIG. 5 is a perspective view of the visor shown in FIG. 1 with one of its panels pivoted from its companion panel.

Panel 50, as best seen in FIG. 5, is a generally concave molded shell having a configuration or profile substantially identical to the facing surface 62 of panel 60 such that it overlies and covers panel 60 as best seen in FIG. 1. The molded polymeric body 52 of panel 50 is made of a polymeric material such as polycarbonate and is upholstered by a fabric 54 on its outer surface to conform to the headliner upholstery 15 over roof 12 of the vehicle.

Figure 6:
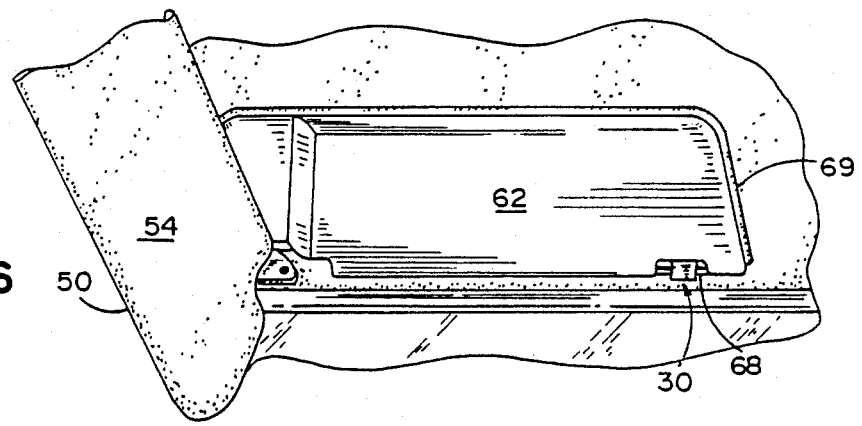
FIG. 6 is a fragmentary perspective view of the visor shown in FIG. 5 with the one panel moved to a side window position.
Figure 7:
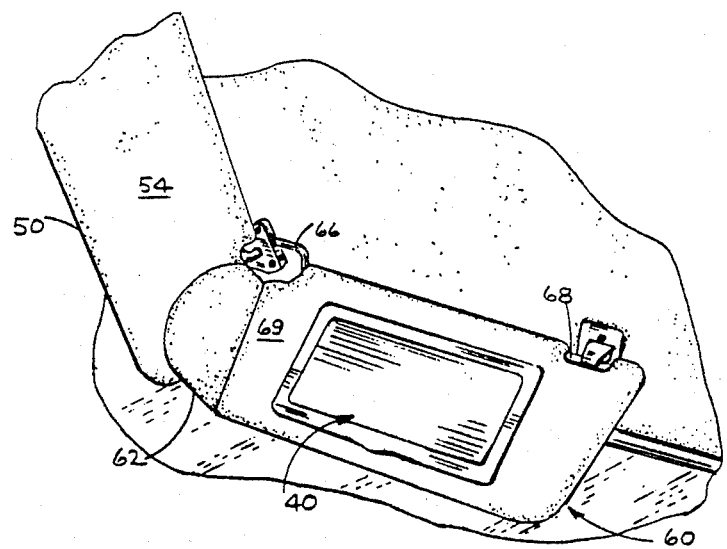
FIG. 7 is a fragmentary perspective of the visor shown in FIGS. 1-6 shown with the second visor panel lowered to provide simultaneous side and front window sun blocking protection.
Figure 8:
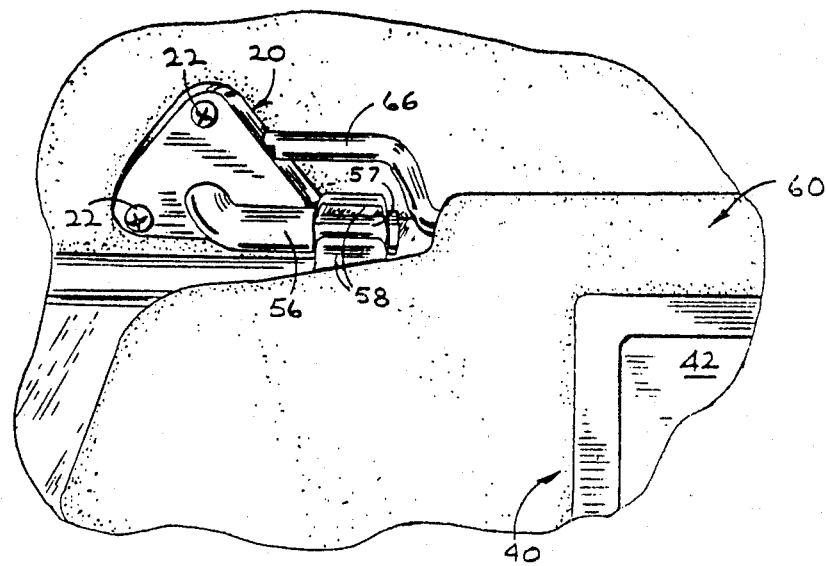
FIG. 8 is an enlarged fragmentary view of the mounting bracket for the visor shown in FIGS. 1-7.

Attached to one end of the first visor panel 50 is an L-shaped pivot rod 56 which extends within a center aperture of a pivot mounting bracket 20 such that the pivot rod can pivot within bracket 20 secured the roof 12 of the vehicle by fasteners 22 permitting the visor panel 50 to be moved from the front window position shown in FIGS. 1-5 to a side window position as illustrated in FIGS. 6-7. Pivot rod 56 is coupled to the molded panel 52 by a snap-in, resilient polymeric socket 58 as best seen in FIGS. 2, 3, and 8 such that the lightweight shell defining panel 50 can pivot about the recessed cylindrical portion 57 of L-shaped pivot rod 56 between a raised stored position shown in FIG. 1 and a lowered use position shown in FIGS. 5-7. The torque interconnection of the end of L-shaped pivot rod 56 extending within bracket 20 provides predetermined torque sufficient to hold panel 50 in a selected side window position as shown in FIGS. 6 and 7.

The concave surface 52 of panel 50, as best seen in FIGS. 1-3, provides a compact, nested connection with panel 60 which has a molded polymeric convex surface 62 on one side mating with surface 52 of panel 50. Panel 60 may include a resilient end flap 64 joined to the thicker body of the main portion of panel 60 by an integral polymeric hinge 65 to allow flap 64 to deflect when the panel 60 is positioned in its lowered use position as shown in FIG. 7. Panel 60 includes a recess 43 (FIGS. 2 and 3) for receiving the illuminated vanity mirror package 40 and can be constructed by folding two core halves together with one core half including a recess 43 and the opposite core half including surface 62 which conforms to the concave surface 52 of panel 50. Panel 60 receives a Z-shaped pivot rod 66 which extends into a side of bracket 20 and is fixed thereto as best seen in FIGS. 2, 3, and 8. The Z-shaped bracket 66 offsets panel 60 from panel 50 to allow the adjacent nested panels to pivot downwardly as a unit as illustrated in FIGS. 2 and 3. A torque fitting such as disclosed in U.S. Pat. No. 4,500,131 is mounted within the body of visor panel 60 and engages the end of the Z-shaped bracket 66 remote from bracket 20 extending within the panel to provide a selected holding and snap-up torque for panel 60.

The end of panel 60 remote from bracket 66 includes a recessed support rod 68 which fits within the support mount 30 for holding the end of panel 60 in place against the headliner 15 of a vehicle. The front surface 69 of visor 60 is upholstered with the same upholstery material as material 54 to conform the visor sides to each other and to the headliner material 15. Bracket 20 can be a steel bracket with the end of Z-shaped rod 66 secured therein by suitable fastening means such as by force fitting, welding, or by a fastener such as a set screw. The end of rod 56 extending within the central aperture of bracket 20, however, allows the free pivoting of the arm and may include a conventional pivot torque fitting or one such as disclosed in U.S. Pat. No. 4,352,518. As best seen in FIG. 8, the longitudinal axes (i.e., the horizontal direction) of pivot rods 56 and 66 are both horizontally and vertically offset to allow the simultaneous pivoting of the duplex visor 10 including panels 50 and 60 from the position shown in FIG. 1 to that shown in FIG. 2 without separation and with the ease and appearance of a single visor.

Figure 9:
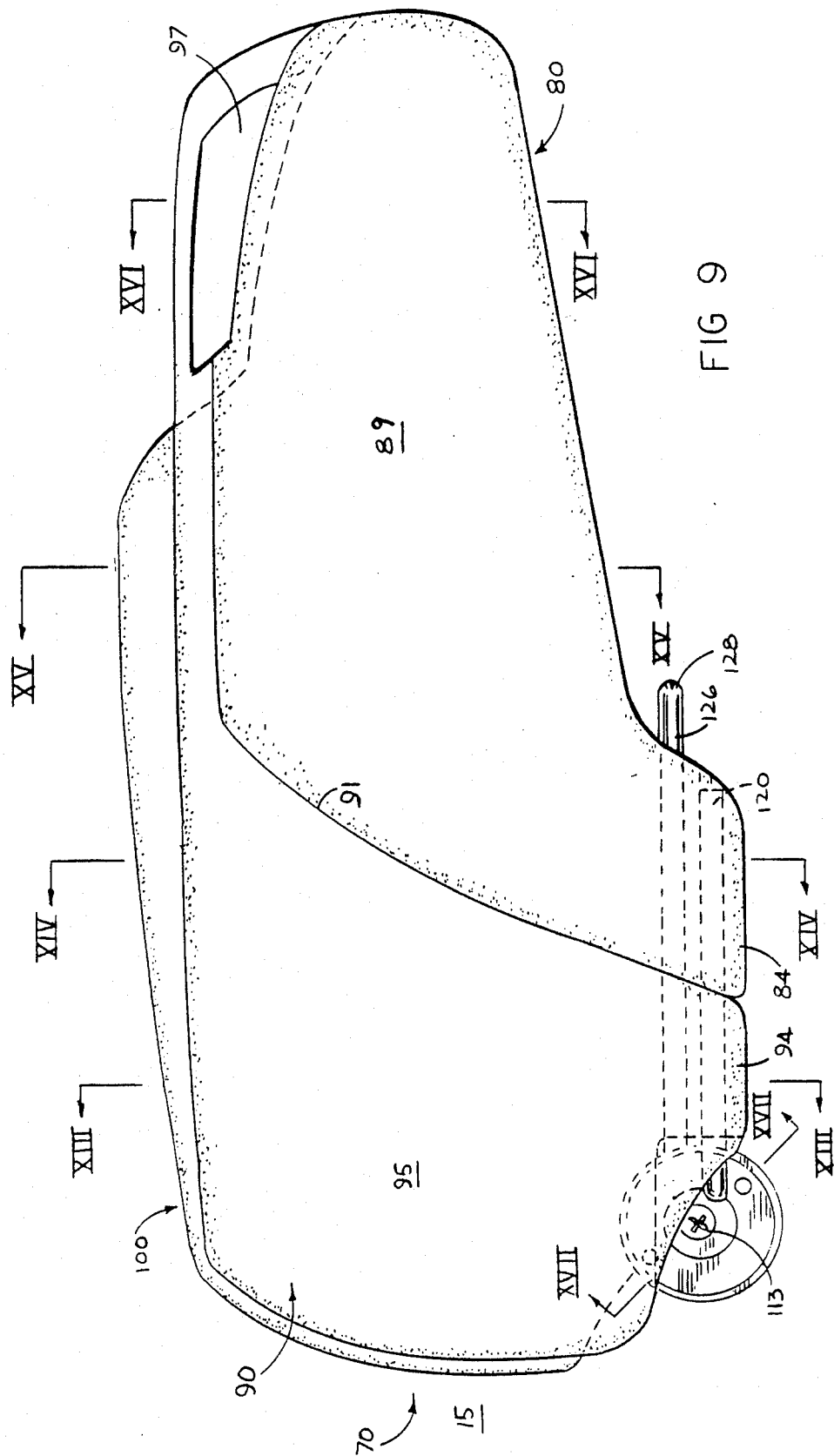
FIG. 9 is a perspective view of an alternative embodiment of the present invention.

A triplex visor embodying the multiplex visor concept embodied in the duplex visor of FIGS. 1-8 is shown in FIGS. 9-17. The visor 70 shown in these figures as seen in FIG. 9 and the cross-sectional profiles of FIGS. 13-16 includes three nested panels 80, 90, and 100. The first visor panel 80 occupies the approximately right half of the visor side facing the vehicle occupant when the visor 70 is in a raised stored position as shown in FIG. 9. The second visor panel 90 includes a recessed concave area 92 for nestably receiving first panel 80 and in turn is nestably received by a third visor panel 100 having a concave interior 102 (FIG. 11) for receiving visor panel 90 and/or nested panels 80 and 90. Before describing the structure of each of the elements of the triplex visor 70, a brief description of the overall operation of this unique visor to provide the user with tremendous flexibility in its use is briefly presented in connection with FIGS. 9-12.

Figure 11:
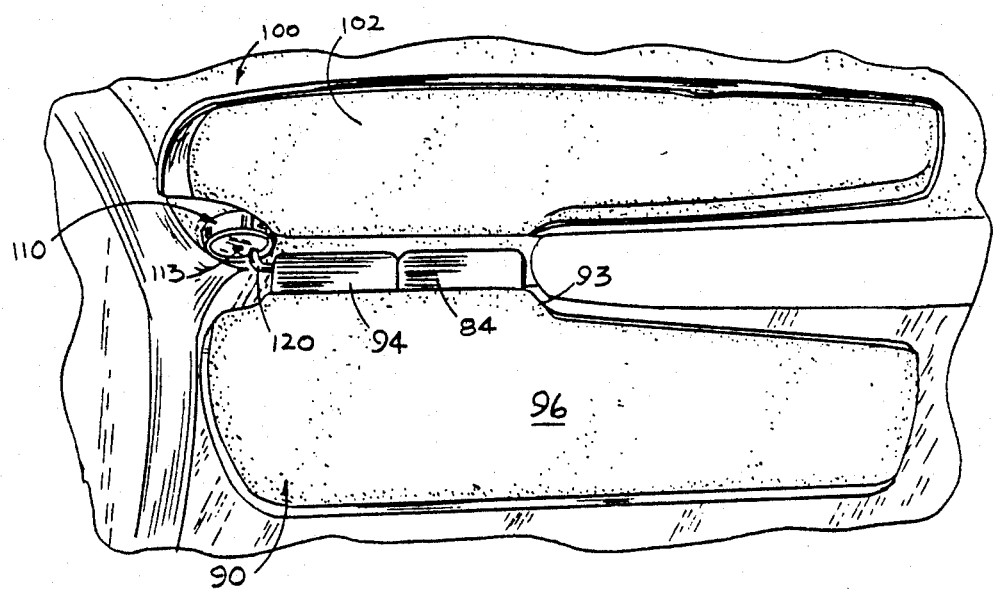
FIG. 11 is a perspective view showing the visor of FIG. 10 with a second panel lowered to a use position.

Initially, the visor can be stowed against the vehicle headliner 15 as illustrated in FIG. 9. In this position, the visor has a general appearance of a single visor with the exception of an exposed seam 91 between visor panels 80 and 90. If the vehicle operator wishes to use an illuminated vanity mirror, the first visor panel 80 is lowered exposing a mirror 82 mounted therein which can be illuminated by illumination means 84 comprising a lens behind which there is positioned lamp means for illumination of the face of the user such that the mirror 82 can be used under low ambient light conditions. Visor panel 80 also serves as a half-size visor which can if desired be used as such, although a full visor can be obtained by the lowering of the pivoted second visor panel as illustrated in FIG. 11. The second visor panel 90 can be lowered as seen in FIG. 11 with panel 80 remaining in a lowered position to provide full visor coverage covering mirror 82 in panel 80. Thus, panels 80 and 90 appear and can move as a single visor unit due to the nesting of panel 80 within panel 90 and can be moved to a position shown in FIG. 9 directly to a position shown in FIG. 11 if desired.

Figure 12:
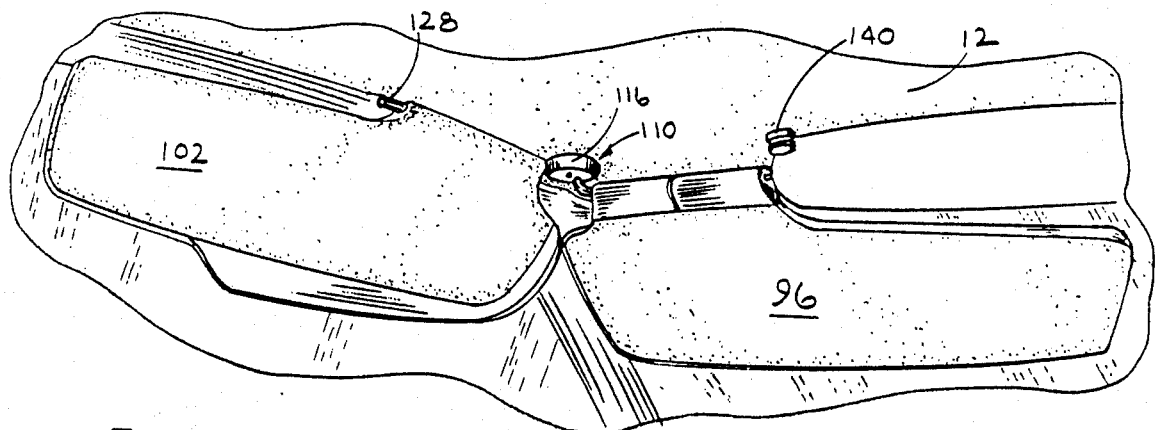
FIG. 12 is a perspective view of the visor system shown in FIGS. 9-11 with a third panel moved to a side window sun blocking position.

The visor also provides side window protection by the lowering and pivoting of the third visor panel 100 from a raised stored position shown in FIG. 11 to a side window position shown in FIG. 12 by the lowering and subsequent pivoting of the visor on the unique pivot rod mount 110 shown in greater detail in FIG. 17 and described below. Having described the basic operation of the triplex visor assembly shown in FIGS. 9-17, a detailed description of the individual visor components is now presented.

Figure 10:
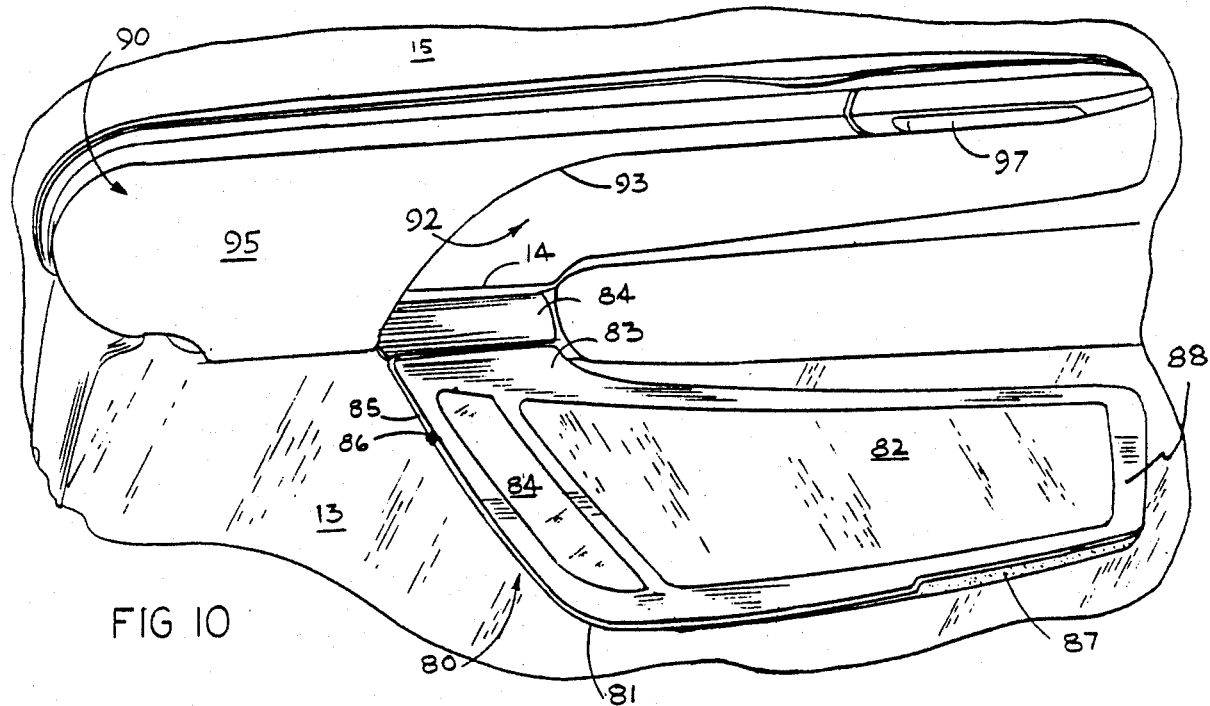
FIG. 10 is a perspective view of the visor shown in FIG. 9 shown with a first panel lowered to a use position.
Figure 17:
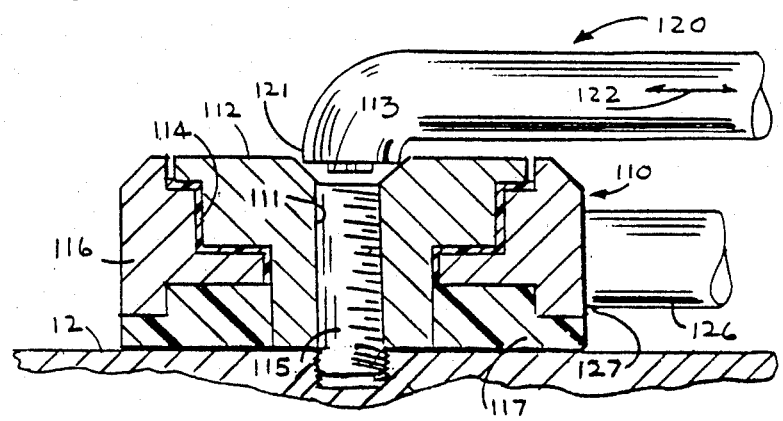
FIG. 17 is an enlarged fragmentary vertical cross-sectional view taken along section lines XVII—XVII of FIG. 9.

As seen in FIGS. 9 and 10, the first visor panel 80 of the triplex visor 70 has a generally rectangular although somewhat teardrop shape terminating in a tail portion 83 which includes a collar 84 with an aperture therethrough for receiving the end of a pivot rod 120 (FIG. 9) which is generally L-shaped and extends into a first support collar 112 of pivot rod fitting 110 as best seen in FIG. 17. Thus, the end 121 of rod 120 is offset from the central axis and opening 111 of collar 112 to offset the longitudinal axis identified by arrow 122 in FIG. 17 of rod 120 from that of a second pivot rod 126 to which visor panel 90 is coupled as described below.

Collar 112 of bracket 110 is fixably mounted to the roof of a vehicle by means of a suitable fastener such as a screw 113 extending through the recessed aperture 111, into a threaded member 115 in roof 12. Surrounding the step-cut collar 112 is a step-cut nylon bushing 114 providing a lubricous polymeric interface between fixed collar 112 and rotating ring 116 to which end 127 of pivot rod 126 is secured. A second nylon bushing 117 extends between the rotatable ring 116 and the sheet metal roof structure 12 of the vehicle to permit rotation of the ring 116 with respect to the roof and member 112. Thus, ring 116 can rotate between fixed members 112 and roof 12 by virtue of the lubricous polymeric interfaces 114 and 117.

The end of pivot rod 120 which extends within collar 84 of visor panel 80 provides a predetermined rotational torque for panel 80 with respect to rod 12 which can be achieved by a molded-on torque fitting as described in the above identified U.S. Pat. No. 4,352,518 with a torque sufficient to hold panel 80 in a raised stored position as shown in FIG. 9 and allow its relatively easy lowering to a stable use position as illustrated in FIG. 10. Electrical conductors are coupled to the lamp position behind the lens 84 of the lighting means and can extend through neck 83 into the hollow pivot rod 120 and to the vehicle's electrical supply, through an aperture through member 112 into which rod 120 is fixed.

Switch means 86 for actuating the illumination means can be mounted within panel 80 and cooperate with panel 90 to automatically provide electrical operating power to the lamp means associated with the illumination means 84 when the visor panel 80 is moved from its nested position with respect to visor panel 90. The button-type push-button switch 86 can be positioned on the edge 85 of visor panel 80 such that when extended from pocket 92, switch 86 will be activated to provide current for the illumination means. When panel 80 is nested within panel 90 as illustrated in FIGS. 9 and 11, however, switch 86 will be depressed inwardly thereby opening the switch to extinguish the illumination means. Like panel 60 of visor 10, panel 80 can be made of a pair of sides integrally joined along a hinge line with one of the sides 88 (FIG. 10) including openings for receiving a mirror and lens and defining a frame around them. The opposite side 89 (FIG. 9) is solid and conforms in appearance to side 95 of panel 90. Surface 89 of panel 80 as well as the entire panel may be made of a suitable polymeric material such as polycarbonate and has a sufficient depth to define a mirror frame supporting the mirror and lens 84 as well as the illumination means behind lens 84 including switch 86. Surface 89 can be pebble grained or textured to provide a pleasing appearance to the panel and match surface 95 of panel 90 to provide a unitary appearance to the visor when in a raised stored position as shown in FIG. 9.

Visor panel 90 is also generally rectangular in shape, although somewhat styled in a modern teardrop shape having an integral neck 93 with a collar 94 which surrounds pivot rod 120 in horizontally spaced relationship to collar 84 of panel 80. Panel 90 may include an upholstered side 96 if desired to provide an exposed upholstered surface when a duplex visor formed by panels 80 and 90 are in a lowered position as shown in FIG. 11 or this side of panel may likewise be an unupholstered, textured polymeric material such as polycarbonate also used for the remaining elements of the visor 70. Recess 92 of panel 90 has a depth and shape including a curved edge 93 conforming to the curvature 81 of panel 80 to provide a unique nested appearance as seen in FIG. 1. Side 95 of panel 90 includes a secondary notch 97 (FIGS. 10 and 16) formed at the upper right tip thereof to allow the user to reach the handle defining recess 87 of panel 80 for lowering of panel 80 without lowering either panels 90 or 100.

Figures 13, 14, 15, 16:
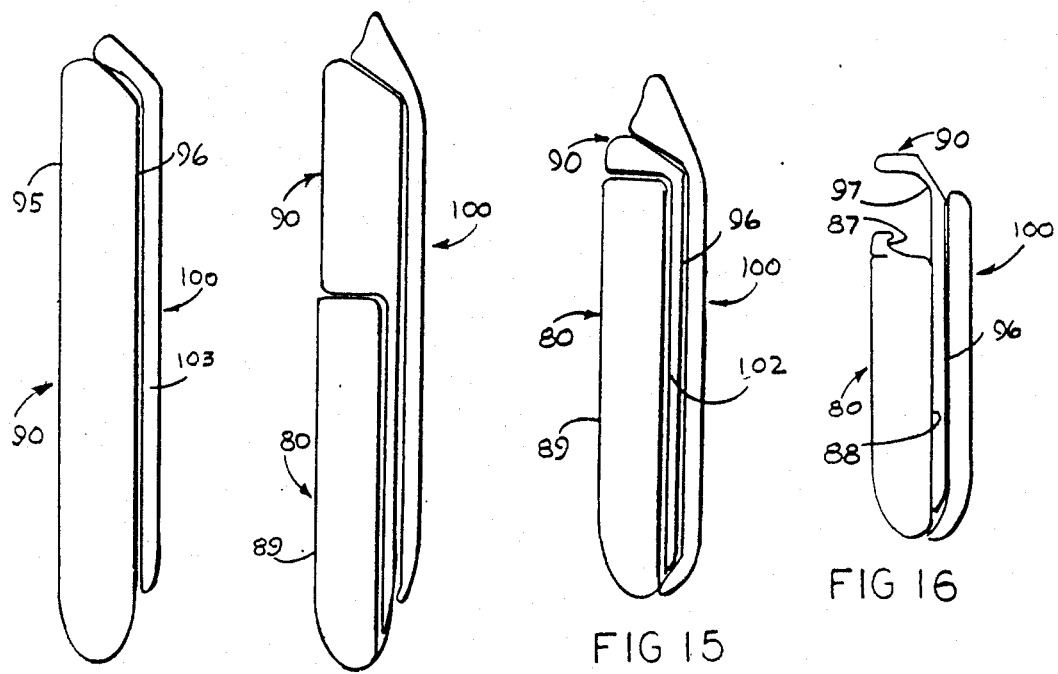
FIG. 13 is a sectional profile taken along section lines XIII—XIII of FIG. 9.
FIG. 14 is a sectional profile taken along section lines XIV—XIV of FIG. 9.
FIG. 15 is a sectional profile taken along section lines XV-XV of FIG. 9.
FIG. 16 is a sectional profile taken along section lines XVI—XVI of FIG. 9.

If the duplex visor defined by panels 80 and 90 is lowered as illustrated in FIG. 11, panel 100 remains in a raised stored position and can be subsequently pivoted downwardly about pivot rod 126 which has a tip end 128 (FIG. 9) which is removably received by a snap-in mount 140 (FIG. 12) mounted to the roof 12 of the vehicle such that it can pivot to the side window position illustrated in FIG. 12 by the pivoting of ring 116 of pivot bracket 110. Panel 100 is a shell-like member having a concave surface 102 which nestably receives panels 90 and 80 in turn nested within one another as best seen in FIG. 15. The cross-sectional profiles of the panels 80, 90, and 100 are shown in FIGS. 13-16 taken along the respective section lines 13, 14, 15, and 16 of FIG. 9. The cross sectional views are only of the relative profile of the visor showing the integrated nested appearance of the panels. The interior core construction of particularly panel 80 is not shown for the sake of clarity in illustrating the overall configuration of the visor panels. From FIGS. 14-16, it is seen that panel 90 is nested and sandwiched between panels 80 and 100 and has a thickness which varies as seen by comparing FIGS. 13 and 15, for example, to maintain an overall substantially constant thickness of visor 70 along its entire length regardless of the number of panels which overlap.

Although the duplex visor comprising panels 80 and 90 can be lowered to provide a single sun blocking visor as illustrated in FIG. 11, the visor 70 can be lowered as a single unit if desired in the same manner as visor 10 shown in FIGS. 1 and 2. The back surface 103 of panel 100 can be covered by a suitable upholstery material if desired to provide an upholstered appearance to the visor when so lowered. Each of the panels 80, 90, and 100 can be made of a suitable polymeric material such as polycarbonate as are panels 50 and 60 of visor 10. These panels can be selectively upholstered as in the first embodiment or the polymeric surface textured as desired or flocked with material to provide an upholstered appearance. The visor panels are each configured to nest within one another, however, to provide an integrated appearance of a single visor taking less room than separate visor panels of the prior art and yet provide the same flexibility as other multiple visor installations with additional features. The unique pivot connection of the visor panels to the vehicle allow selected movement of the visor panels by providing offset pivot axes with one of the pivot axles being rotatable to accommodate movement from the windshield area to the side window of the vehicle.

It will become apparent to those skilled in the art that various modifications to the preferred embodiments of the invention as described herein can be made without departing from the spirit or scope thereof as defined in the appended claims.

The embodiments of the invention in which an exclusive property or privilege is claimed are defined as follows:

1. A visor for use in a vehicle comprising:
   a body defined by a plurality of generally planer nested sections which are movable with respect to one another for movement between adjacent nested positions to define a single visor and spaced-apart positions to define multiple visor panels wherein at least one of said panels has a concave surface facing a second one of said panels such that said one and second panels nest together; and
   means for mounting said visor to a vehicle for movement of said visor and sections thereof.

2. The visor as defined in claim 1 wherein said visor includes at least two sections.

3. The visor as defined in claim 2 wherein one of said sections includes a vanity mirror.

4. The visor as defined in claim 3 wherein said one section includes means for illuminating said vanity mirror.

5. The visor as defined in claim 4 wherein said means for mounting said visor includes a pair of pivot axles to which said sections are pivotally mounted and wherein said pivot axles are off-set from each other.

6. The visor as defined in claim 5 wherein said means for mounting said visor further includes a mounting bracket for securing said pivot axles to the vehicle.

7. The visor as defined in claim 6 wherein one of said pivot axles is rotatably mounted to said mounting bracket to allow the other of said sections mounted thereto to pivot to a side window position.

8. The visor as defined in claim 1 wherein one of said sections includes a vanity mirror.

9. The visor as defined in claim 8 wherein said one of said sections includes means for illuminating said vanity mirror.

10. The visor as defined in claim 1 wherein said means for mounting said visor includes a pair of pivot axles to which said sections are pivotally mounted and wherein said pivot axles are off-set from each other.

11. A visor for use in a vehicle comprising:
    a body defined by a plurality of generally planer nested sections which are movable with respect to one another for movement between adjacent nested positions to define a signal visor and spaced-apart positions to define multiple visor panels wherein said visor includes three section; and
    means for mounting said visor to a vehicle for movement of said visor and sections thereof.

12. The visor as defined in claim 11 wherein one of said sections includes a vanity mirror.

13. The visor as defined in claim 12 wherein said one section includes means for illuminating said vanity mirror.

14. The visor as defined in claim 13 wherein said means for mounting said visor includes a pair of pivot axles to which said sections are pivotally mounted and wherein said pivot axles are off-set from each other.

15. The visor as defined in claim 14 wherein said means for mounting said visor further includes a mounting bracket for securing said pivot axles to the vehicle.

16. The visor as defined in claim 15 wherein said one and a second section of said visor are pivotally mounted to one of said pivot axles and a third section is pivotally mounted to the other of said pivot axles.

17. The visor as defined in claim 16 wherein the other of said pivot axles is rotatably mounted to said mounting bracket to allow the third of said sections mounted thereto to pivot to a side window position.

18. A visor for use in a vehicle comprising:
    a body defined by a plurality of generally planer sections defining panels one of which includes a concave surface for nestably receiving a second panel, wherein said panels are movable with respect to one another for movement between overlapping nested positions to define a single visor and spaced-apart positions to define multiple visor panels; and
    means for mounting said visor to a vehicle for permitting movement of said visor and said panels to a plurality of positions.

19. The visor as defined in claim 18 wherein said visor includes two panels.

20. The visor as defined in claim 19 wherein one of said panels includes a vanity mirror.

21. The visor as defined in claim 20 wherein said one panel includes means for illuminating said vanity mirror.

22. The visor as defined in claim 21 wherein said means for mounting said visor includes a bracket and a pair of pivot axles extending therefrom in off-set relationship from each other to allow both panels to simultaneously pivot from a raised stored position adjacent the vehicle roof to at least one lowered use position.

23. A visor for use in a vehicle comprising:
    a body defined by a plurality of generally curvilinear nested panels which are movable with respect to one another for movement between adjacent nested positions to define a single visor and spaced-apart positions to define multiple visor panels, wherein said visor includes two panels and wherein one of said panels includes a vanity mirror and means for illuminating said vanity mirror; and
    means for mounting said visor to a vehicle for permitting movement of said visor and said panels to a plurality of positions wherein said means for mounting said visor includes a bracket and a pair of pivot axles extending therefrom in off-set relationship from each other to allow both panels to simultaneously pivot from a raised stored position adjacent the vehicle roof to at least one lowered use position, and wherein one of said pivot axles is L-shaped and has an end pivotally extending into said bracket and the other axle is Z-shaped.

24. The visor as defined in claim 23 wherein said visor includes a third panel and wherein said one panel and other panel are pivotally mounted to one of said pivot axles and said third panel is mounted to said other axle.

25. A visor divided into multiple nested sections comprising:
    at least first and second generally planar visor panels having generally the same overall size and shape, each of said panels having facing curvilinear surfaces which nest together to define a visor; and
    means for mounting said visor to a vehicle such that each of said panels can be moved from a raised stored position together and adjacent the vehicle roof to a lowered use position and also separated from each other to provide simultaneous sun blocking for the front and side windows.

26. A sun visor comprising:

a pair of generally planar panels with one panel having a concave surface and the other panel having a convex surface which nests adjacent said concave surface such that the two panels when together appear as a single visor; and means for mounting said panels to a vehicle such that said panels can be moved from a position adjacent each other between a raised stored position and a lowered sun blocking position and positions separated from one another to provide front and side window sun blocking.

27. A multiplex visor comprising:

first and second visor panels overlapping and nested together;

a first pivot rod extending through said first and second panels and mounted to a vehicle to permit either said first or both of said panels to be moved from a raised stored position to a lowered use position;

a third visor panel configured to nestably receive said first and second panels; and a second pivot rod extending into said third panel and means for pivotally mounting an opposite end of said second pivot rod to a vehicle for movement of said third panel to a side window position.

28. The visor as defined in claim 27 wherein said means for pivotally mounting said second pivot rod to the vehicle comprises a ring rotatably mounted to the vehicle.

* * * * *

UNITED STATES PATENT AND TRADEMARK OFFICE
CERTIFICATE OF CORRECTION

PATENT NO. : 4,858,982

DATED : 8/22/89

INVENTOR(S) : R. Dykstra

It is certified that error appears in the above-identified patent and that said Letters Patent is hereby corrected as shown below:

Column 3, Line 29
After "secured" insert --to--

Column 5, Line 32
"12" should be --120--

Column 7, Line 13
"planer" should be --planar--

Column 7, Line 52
"planer" should be --planar--

Column 7, Line 57
"section" should be --sections--

Column 8, Line 13
"planer" should be --planar--

Signed and Sealed this

Twelfth Day of November, 1991

Attest:

HARRY F. MANBECK, JR.

*Attesting Officer*  *Commissioner of Patents and Trademarks*